United States Patent
Ogiwara et al.

(10) Patent No.: US 10,794,535 B2
(45) Date of Patent: Oct. 6, 2020

(54) HIGH PRESSURE TANK

(71) Applicant: HONDA MOTOR CO., LTD., Minato-ku, Tokyo (JP)

(72) Inventors: Naoki Ogiwara, Wako (JP); Satoru Kawase, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 15/920,586

(22) Filed: Mar. 14, 2018

(65) Prior Publication Data

US 2018/0266627 A1    Sep. 20, 2018

(30) Foreign Application Priority Data

Mar. 17, 2017    (JP) .................................. 2017-053091

(51) Int. Cl.
| | |
|---|---|
| *F17C 1/02* | (2006.01) |
| *F17C 13/08* | (2006.01) |
| *F17C 13/06* | (2006.01) |

(52) U.S. Cl.
CPC ................ *F17C 1/02* (2013.01); *F17C 13/06* (2013.01); *F17C 13/084* (2013.01); *F17C 2201/0109* (2013.01); *F17C 2201/056* (2013.01); *F17C 2203/012* (2013.01); *F17C 2203/0604* (2013.01); *F17C 2203/0624* (2013.01); *F17C 2203/0636* (2013.01); *F17C 2203/0646* (2013.01); *F17C 2203/0658* (2013.01); *F17C 2203/0663* (2013.01); *F17C 2205/0103* (2013.01); *F17C 2205/0305* (2013.01);
(Continued)

(58) Field of Classification Search
CPC .......... F17C 13/04; F17C 13/123; F17C 1/02; F17C 13/06
See application file for complete search history.

(56) References Cited

U.S. PATENT DOCUMENTS

| | | | | |
|---|---|---|---|---|
| 3,323,541 | A | * | 6/1967 | Schneider, Jr. ........ F17C 13/123 137/312 |
| 4,690,295 | A | * | 9/1987 | Wills ........................ F17C 1/16 220/203.08 |

(Continued)

FOREIGN PATENT DOCUMENTS

| | | |
|---|---|---|
| JP | 08-099544 | 4/1996 |
| JP | 2005-273724 | 10/2005 |

(Continued)

OTHER PUBLICATIONS

Japanese Office Action for Japanese Patent Application No. 2017-053091 dated Dec. 4, 2018.

*Primary Examiner* — Andrew T Kirsch
(74) *Attorney, Agent, or Firm* — Amin, Turocy & Watson, LLP

(57) ABSTRACT

A high pressure tank includes: a resin liner for containing a fluid; a reinforced layer covering an outer surface of the liner; a cap including a supply/discharge hole to supply and discharge the fluid to and from the liner; a barrier layer; and an isolation wall member. The cap includes a cylindrical protrusion having the supply/discharge hole. The barrier layer covers an outer surface of the reinforced layer to block all or at least part of the fluid, and includes an opening to expose the protrusion. The isolation wall member forms a closed space accommodating the protrusion and the opening of the barrier layer.

6 Claims, 3 Drawing Sheets

(52) U.S. Cl.
CPC .......................... *F17C 2205/0326* (2013.01);
*F17C 2221/012* (2013.01); *F17C 2223/0123*
(2013.01); *F17C 2260/036* (2013.01); *F17C
2260/037* (2013.01); *F17C 2270/0184*
(2013.01); *Y02E 60/321* (2013.01)

(56) References Cited

U.S. PATENT DOCUMENTS

| | | | | |
|---|---|---|---|---|
| 4,834,137 | A | * 5/1989 | Kawaguchi | ........... F17C 13/123 |
| | | | | 137/312 |
| 5,476,189 | A | * 12/1995 | Duvall | ...................... F17C 1/16 |
| | | | | 220/588 |
| 5,701,928 | A | 12/1997 | Aoki | |
| 2012/0048865 | A1 | * 3/2012 | Eihusen | ................ F17C 13/002 |
| | | | | 220/586 |
| 2018/0172207 | A1 | 6/2018 | Uehara et al. | |

FOREIGN PATENT DOCUMENTS

| | | |
|---|---|---|
| JP | 2008-309219 | 12/2008 |
| WO | 2016/189664 | 12/2016 |

\* cited by examiner

HIGH PRESSURE TANK

CROSS-REFERENCE TO RELATED APPLICATION

This application is based upon and claims the benefit of priority from Japanese Patent Application No. 2017-053091 filed on Mar. 17, 2017, the contents of which are incorporated herein by reference.

BACKGROUND OF THE INVENTION

Field of the Invention

The present invention relates to a high pressure tank that includes a liner that can contain a fluid inside and is made of resin, a reinforced layer that covers an outer surface of the liner, and a cap that includes a supply/discharge hole that is formed to supply and discharge the fluid to and from an interior of the liner.

Description of the Related Art

High pressure tanks are widely used as containers that contain fluids such as gases and liquids. For example, a high pressure tank is mounted on a fuel cell vehicle as a container for a hydrogen gas to be supplied to a fuel cell system.

A high pressure tank of this type is known to include liner that can contain a fluid inside and is made of resin, a reinforced layer that covers an outer surface of the liner and is made of fiber-reinforced plastics, and a cap that includes a supply/discharge hole that is formed therein to supply and discharge a fluid to and from an interior of the liner. For example, a fixing member such as a valve is fixed to this supply/discharge hole. Via the fixing member, the fluid can be supplied to the interior of the liner, and the fluid contained inside the liner can be discharged.

By the way, the resin liner tends to readily allow the fluid to permeate therethrough, compared to a liner made of metal such as aluminum. Hence, Japanese Laid-Open Patent Publication No. 2005-273724 proposes fixing, to an inner surface of a liner, a resin film with a metal layer partially formed thereon to prevent a fluid from passing through the liner and leaking out of a high pressure tank. Thus, the fluid is prevented from permeating a portion of the liner provided with the metal layer.

SUMMARY OF THE INVENTION

However, to obtain the liner with the resin film fixed to its inner surface, at first, it is necessary to prepare two liner units having shapes formed by dividing the liner equally along a direction perpendicular to its axial direction (substantially hemispherical shapes). Further, the resin film needs to be fixed to the inner surfaces of the liner units through their openings. Then, end portions of the openings of the liner units need to be bonded. Therefore, the high pressure tank including this liner employs a complicated configuration and undergoes a complicated manufacturing process.

A main object of the present invention is to provide a high pressure tank that can prevent leakage of a fluid by a simple configuration.

One embodiment of the present invention provides a high pressure tank that includes: a resin liner configured to contain a fluid; a reinforced layer covering an outer surface of the liner; and a cap including a supply/discharge hole configured to supply and discharge the fluid to and from the liner, wherein: the cap includes a cylindrical protrusion having the supply/discharge hole formed therein; the high pressure tank further includes: a barrier layer covering an outer surface of the reinforced layer to block all or at least part of the fluid, the barrier layer including an opening to expose the protrusion; and an isolation wall member configured to enclose the protrusion and the opening of the barrier layer in a closed space.

In this high pressure tank, the outer layer of the reinforced layer is covered by the barrier layer. Consequently, even when the fluid contained inside the liner permeates the liner and the reinforced layer, it is possible to prevent the fluid from permeating the barrier layer. This barrier layer is provided with the opening through which the protrusion of the cap is exposed. The opening is accommodated together with the protrusion in the closed space formed inside the isolation wall member. Hence, the fluid enters a gap between the outer surface of the reinforced layer and the barrier layer moves toward the opening of the barrier layer, and then is collected in the closed space via the opening.

As described above, the protrusion is also accommodated in the closed space. Therefore, the fluid having leaked out of the liner via the supply/discharge hole formed inside the protrusion is also collected in the closed space. Further, as described above, the fluid having been collected in the closed space can be guided to, for example, an appropriate site outside the high pressure tank. Consequently, it is possible to effectively prevent unintentional leakage of the fluid to the outside of the high pressure tank.

In view of the above, this high pressure tank can avoid a complicated configuration and a complicated manufacturing process, compared to a configuration where a film having barrier properties against the fluid is arranged on the inner surface of the liner, for example. As a result, a simple configuration can effectively prevent the leakage of the fluid to the outside of the high pressure tank.

As described above, the barrier layer is arranged on the outer surface of the reinforced layer. Consequently, the inner surface of the reinforced layer can be placed in direct contact with the outer surface of the liner. As a result, the liner is suitably reinforced by the reinforced layer. It is possible to prevent leakage of the fluid, while keeping suitable strength of the high pressure tank.

The isolation wall member only needs to be arranged to form the closed space that accommodates the protrusion and the opening of the barrier layer, and does not need to cover the entire liner and reinforced layer. Compared to a case where the entire liner and reinforced layer are covered by the isolation wall member, it is possible to increase a degree of design freedom in fixing the high pressure tank to an installation site.

Preferably, in the high pressure tank, the reinforced layer is made of a carbon fiber reinforced resin, and the high pressure tank further includes a glass fiber reinforced resin layer covering at least part of an outer surface of the barrier layer. In this case, it is possible to effectively improve the strength of the high pressure tank. Further, with the glass fiber reinforced resin layer, it is possible to maintain the strength of the high pressure tank, while reducing the thickness of the reinforced layer made of the carbon fiber reinforced resin.

The barrier layer is disposed between the outer surface of the reinforced layer and the glass fiber reinforced resin layer. Consequently, it is possible to design a shape of the glass fiber reinforced resin layer without assuming that the glass fiber reinforced resin layer is covered by the barrier layer.

That is, it is possible to increase the degree of freedom in the shape of the glass fiber reinforced resin layer. Hence, the glass fiber reinforced resin layer is arranged to cover the outer surface of a portion of the reinforced layer except a curved dome-shaped portion, so that it is possible to avoid a bending force from being applied to the glass fibers having higher rigidity than carbon fibers. As a result, it is possible to more easily obtain the high pressure tank with high strength, while effectively suppressing leakage of the fluid.

In the high pressure tank, the barrier layer is preferably formed of a film wound around the outer surface of the reinforced layer to block all or at least part of the fluid. In this case, the barrier layer can be easily formed to have a desired thickness depending on the use of the high pressure tank.

In the high pressure tank, the high pressure tank is preferably fixed by a fixing band arranged along at least part of an outer circumferential surface. As described above, this high pressure tank has the increased degree of design fixing the high pressure tank. More specifically, since the outer circumferential surface of the high pressure tank does not need to be covered by the isolation wall member, the fixing bands can be arranged along the outer circumferential surface. By using the fixing bands in this way, it is possible to easily and simply fix the high pressure tank to the installation portion.

In the high pressure tank, a flow path for the fluid is preferably formed between at least a portion of the barrier layer to which a pressing force is applied through the fixing band and the outer surface of the reinforced layer. In this case, even when fastening forces of the fixing bands cause the barrier layer to be pressed against the outer surface of the reinforced layer; it is possible for the fluid to flow between the barrier layer and the reinforced layer. Consequently, even when the high pressure tank is fixed by the fixing bands, the fluid having entered between the outer surface of the reinforced layer and the barrier layer can be guided to and collected in the closed space suitably via the flow paths and the opening of the barrier layer.

Preferably, the high pressure tank is mounted on a vehicle, and includes a communication unit communicating the closed space to an outside of the vehicle. In this case, even when the fluid leaks from a fluid containing portion formed inside the liner, the reinforced layer, the barrier layer and the cap, the fluid can be collected in the closed space formed inside the isolation wall member and guided to the outside of the vehicle without leaking out of the high pressure tank.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a high pressure tank according to the present invention will be described in detail below with reference to the accompanying drawings.

The high pressure tank according to the present invention is mounted on, for example, a fuel cell vehicle, and is suitably used to contain a hydrogen gas to be supplied to a fuel cell system. The present embodiment will describe an example where the high pressure tank contains a hydrogen gas as a fluid to be supplied to the fuel cell system, yet is not limited to this in particular. The high pressure tank according to the present invention can contain a fluid other than the hydrogen gas.

Figure 1:
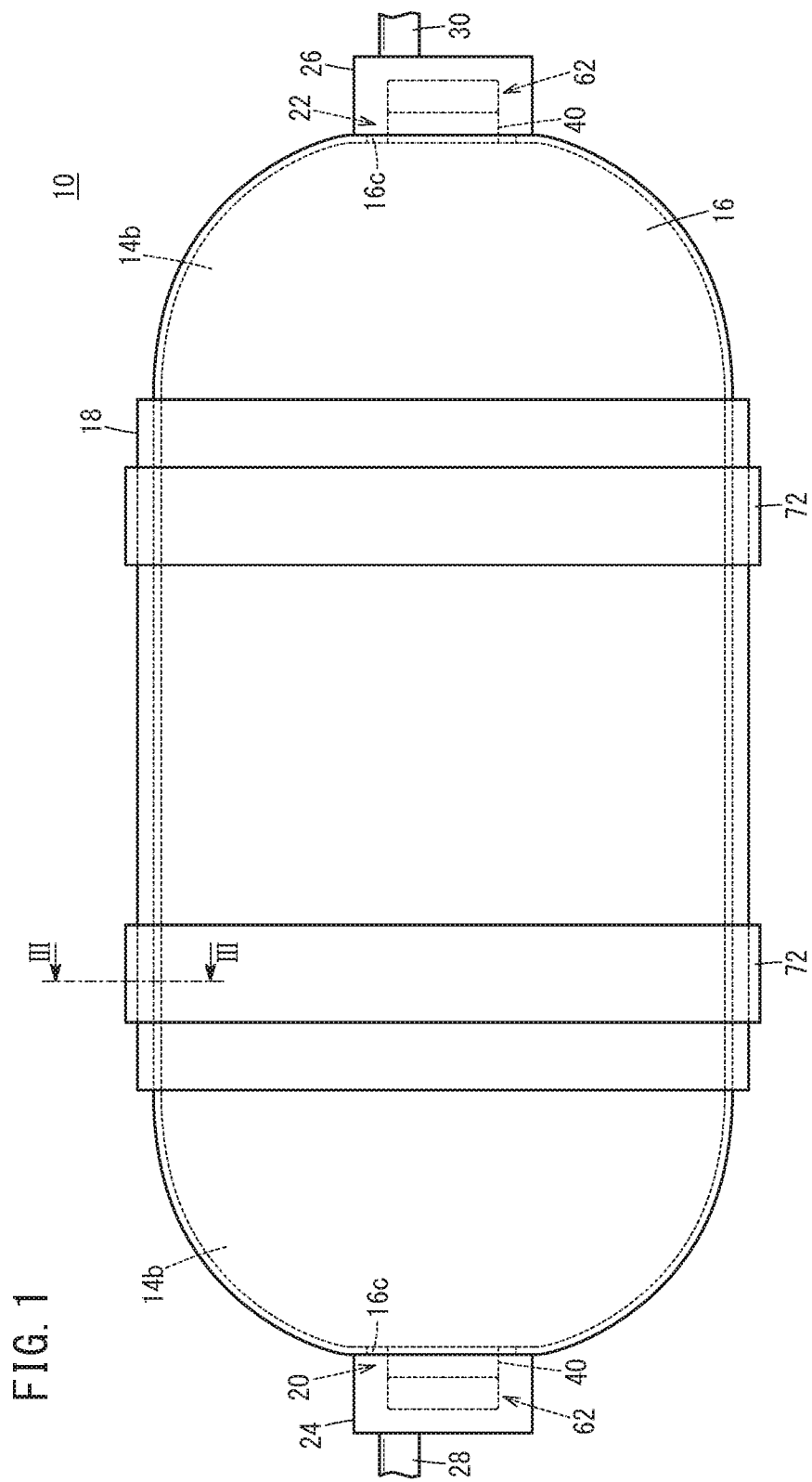
FIG. 1 is a schematic front view of a high pressure tank according to an embodiment of the present invention.
Figure 2:
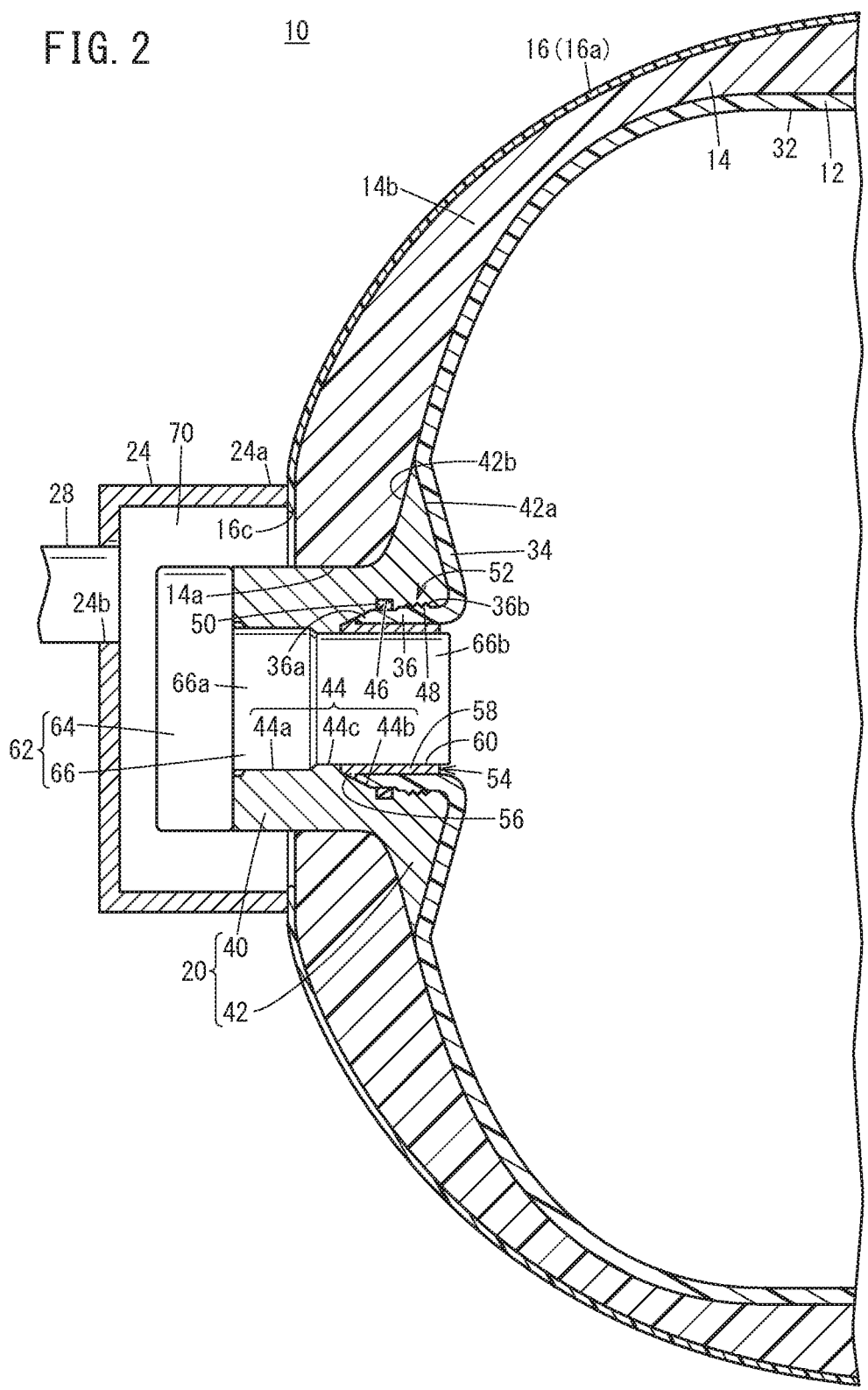
FIG. 2 is an enlarged cross-sectional view of a main portion of the high pressure tank shown in FIG. 1.
Figure 3:
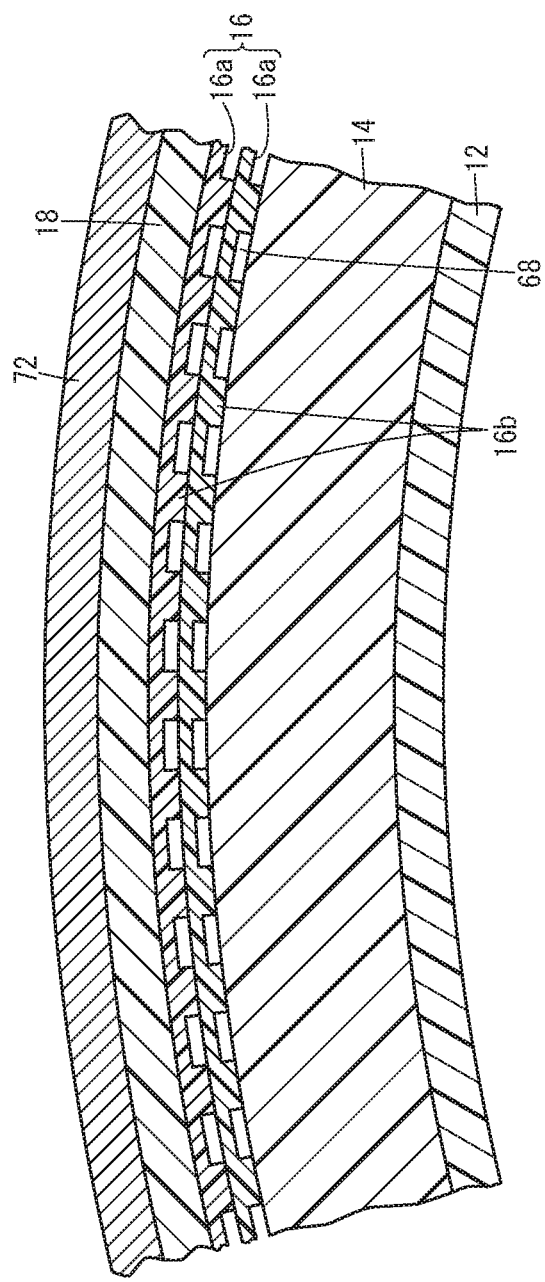
FIG. 3 is a cross-sectional view of the high pressure tank taken along the line III-III in FIG. 1.

As shown in FIGS. 1 to 3, a high pressure tank 10 according to the embodiment of the present invention includes a liner 12, a reinforced layer 14 that covers an outer surface or the like of the liner 12, a barrier layer 16 that covers an outer surface of the reinforced layer 14, and a glass fiber reinforced resin layer 18 that covers part of an outer surface of the barrier layer 16. Further, the high pressure tank 10 includes caps 20, 22, isolation wall members 24, 26 and communication units 28, 30 at both ends in an axial direction. The high pressure tank 10 according to the present embodiment employs the substantially same configuration on one end side and the other end side in the axial direction. Therefore, the one end side will be described, and the other end side will not be specifically described.

As shown in FIG. 2, the liner 12 is a hollow resin body, and can contain a hydrogen gas. More specifically, the liner 12 includes a main body portion 32, a dented portion 34 that is bent inward of the main body portion 32, a cylindrical portion 36 that protrudes outward of the main body portion 32 from the dented portion 34.

A thin portion 36a thinner than other portions is formed on a protrusion end (distal end) of the cylindrical portion 36, and is. A male screw 36b is formed on a side closer to a proximal end than the thin portion 36a of the cylindrical portion 36. The cap 20 is fitted onto the cylindrical portion 36.

The cap 20 is made of metal, for example, and has a protrusion 40 of a cylindrical shape and a shoulder portion 42 that extends radially outward from the proximal end of the protrusion 40. A supply/discharge hole 44 is formed, penetrating along the axial direction of the protrusion 40.

An end surface 42a of the shoulder portion 42 on a side opposite to the protrusion 40 is brought into contact with an outer surface of the dented portion 34 of the liner 12. An outer surface 42b of the shoulder portion 42 on a side of the protrusion 40 is covered by the reinforced layer 14 together with the liner 12. That is, the cap 20 has a shape that the shoulder portion 42 is covered together with the liner 12 by the reinforced layer 14 and the protrusion 40 is exposed and protrudes through an opening 14a of the reinforced layer 14. In the present embodiment, the proximal end side of the protrusion 40 is partially covered by the reinforced layer 14 by the amount corresponding to the thickness of the reinforced layer 14.

An outer diameter of the protrusion 40 is substantially constant. On the other hand, an inner diameter of the protrusion 40, i.e., a diameter of the supply/discharge hole 44 differs per portion. More specifically, the supply/discharge hole 44 includes a medium diameter hole 44a located on the side of the protrusion 40 in the axial direction, a large diameter hole 44b located on a side of the shoulder portion 42, and a small diameter hole 44c formed between the medium diameter hole 44a and the large diameter hole 44b.

The cylindrical portion 36 is inserted in the large diameter hole 44b. Thus, an outer circumferential surface of the cylindrical portion 36 is disposed along an inner circumferential surface of the large diameter hole 44b. That is, an inner diameter of the large diameter hole 44b is set to a size matching an outer diameter of the cylindrical portion 36. More specifically, an inner diameter of a portion of the large diameter hole 44b facing toward the thin portion 36a is smaller than an inner diameter of a portion on a side closer to the proximal end than the thin portion 36a. An inner wall of the large diameter hole 44b includes, at a portion that facing toward the thin portion 36a of the cylindrical portion 36, a seal groove 46 of an annular shape along a circumferential direction of the large diameter hole 44b, and at a portion that facing toward the male screw 36b of the cylindrical portion 36, and at which a female screw 48 to be screwed with the male screw 36b.

A seal member 50 is disposed inside the seal groove 46, and is formed by an O ring. A distance (seal gap) between an inner wall surface of the seal groove 46 and the outer circumferential surface of the thin portion 36a is set to maintain a compressed state of the seal member 50 therebetween. Thus, the outer circumferential surface of the cylindrical portion 36 and the inner circumferential surface of the supply/discharge hole 44 of the cap 20 are sealed.

On a side closer to the proximal end of the cylindrical portion 36 than the seal groove 46, the male screw 36b and the female screw 48 are screwed to form a bonding portion 52 that bonds the outer circumferential surface of the cylindrical portion 36 and the inner circumferential surface of the large diameter hole 44b.

A collar 54 is further disposed inside the large diameter hole 44b to support the cylindrical portion 36. The collar 54 is made of metal, for example, and includes a collar head portion 56 of an annular shape and a cylinder portion 58 of a cylindrical shape integrally formed with the collar head portion 56. A passage hole 60 is formed, penetrating the collar 54 along the axial direction of the cylinder portion 58. The diameter of the passage hole 60 is substantially equal to the diameter of the small diameter hole 44c of the supply/discharge hole 44.

In the large diameter hole 44b, one end surface of the collar head portion 56 comes into contact with a step surface formed between the small diameter hole 44c and the large diameter hole 44b, and the other end surface of the collar head portion 56 comes into contact with a distal end surface of the cylindrical portion 36. The cylinder portion 58 is inserted on an inner side of the cylindrical portion 36, so that the passage hole 60 communicates with the medium diameter hole 44a and the small diameter hole 44c of the supply/discharge hole 44 and the interior of the liner 12. An outer circumferential surface of the cylinder portion 58 extends along the circumferential surface of the large diameter hole 44b with the cylindrical portion 36 interposed therebetween. That is, the cylindrical portion 36 is sandwiched between the outer circumferential surface of the cylinder portion 58 and the inner circumferential surface of the large diameter hole 44b.

From a viewpoint to sandwich the cylindrical portion 36 more suitably, the cylinder portion 58 is preferably press-fitted in the cylindrical portion 36. In this case, the cylinder portion 58 presses the cylindrical portion 36 toward the circumferential surface of the large diameter hole 44b. Then, the outer circumferential surface of the cylindrical portion 36 comes into pressing contact with the inner circumferential surface of the large diameter hole 44b. Consequently, it is easy to keep the seal gap constant.

A fixing member 62 is fixed to the supply/discharge hole 44. The fixing member 62 is formed of, for example, a solenoid valve. The hydrogen gas is supplied to and discharged from the interior of the liner 12 via the fixing member 62. That is, for example, a hydrogen gas supply pipe connected to a hydrogen supply source, and a hydrogen gas discharge pipe connected to the fuel cell system (none of which is shown) are inserted through the fixing member 62.

The fixing member 62 includes a head portion 64 and an insertion portion 66. The head portion 64 has, for example, a columnar shape whose diameter is substantially equal to the outer diameter of the protrusion 40. The insertion portion 66 has a columnar shape that protrudes from a substantial center of one end surface of the head portion 64 and is inserted into the supply/discharge hole 44. The insertion portion 66 includes a large diameter portion 66a on a proximal end side, and a small diameter portion 66b on a distal end side. The large diameter portion 66a is inserted in the medium diameter hole 44a such that a circumferential surface of the large diameter portion 66a is in contact with a surface of the medium diameter hole 44a. The small diameter portion 66b is inserted in the small diameter hole 44c and the passage hole 60 such that a circumferential surface of the small diameter portion 66b is in contact with surfaces of the small diameter hole 44c and the passage hole 60.

The reinforced layer 14 is made of a carbon fiber reinforced plastic (CFRP) for which carbon fibers are used as reinforcing fibers, and covers the outer surface of the liner 12 and the outer surface 42b of the shoulder portion 42 of the cap 20 as described above. The reinforced layer 14 includes the opening 14a through which the protrusion 40 of the cap 20 is exposed, and a dome-shaped portion 14b that curves in a dome shape.

The barrier layer 16 is formed by winding a resin film 16a with an aluminum deposited layer around the outer surface of the reinforced layer 14 a plurality of times until the film 16a has a desired thickness (see FIG. 3). The barrier layer 16 has properties, i.e., gas barrier properties that block permeation of all or at least part of hydrogen gas.

As shown in FIG. 3, in the present embodiment, a ridge/groove portion 16b is formed on the surface of the film 16a. Thus, gaps are formed between the film 16a and the outer surface of the reinforced layer 14, as flow paths 68 of the hydrogen gas. The ridge/groove portion 16b of the film 16a is omitted from FIG. 2. FIG. 3 shows only two layers of the wound film 16a. The barrier layer 16 includes an opening 16c through which the protrusion 40 of the cap 20 is exposed.

As shown in FIG. 1, the glass fiber reinforced resin layer 18 is made of a glass fiber reinforced plastic (GFRP), and is arranged to cover, for example, an outer surface of a portion except the dome-shaped portion 14b of the reinforced layer 14.

The isolation wall member 24 forms a closed space 70 that accommodates the protrusion 40 of the cap 20 and the opening 16c of the barrier layer 16. In the present embodiment, the isolation wall member 24 has a bottomed cylindrical shape with an open end portion 24a, and can form the closed space 70 by attaching the end portion 24a to an unillustrated attachment portion.

An insertion hole (not shown) through which the hydrogen gas supply pipe and the hydrogen gas discharge pipe are inserted is formed in the isolation wall member 24 to let a hydrogen gas to flow to the liner 12 via the closed space 70 and the fixing member 62. For example, seal members (not shown) are provided to keep airtightness between the insertion hole and each of the hydrogen gas supply pipe and the hydrogen gas discharge pipe.

The communication unit 28 is formed as, for example, a communication pipe that communicates with the closed space 70 via a through-hole 24b formed in the isolation wall member 24. In the present embodiment, the communication unit 28 connects the closed space 70 to the outside of the fuel cell vehicle.

The high pressure tank 10 according to the present embodiment is basically configured as described above. This high pressure tank 10 is fixed to a predetermined portion of the fuel cell vehicle by a fixing band 72. The fixing band 72 is made of metal, for example, and is disposed along at least part of an outer circumferential surface of the glass fiber reinforced resin layer 18.

As described above, the hydrogen gas is supplied from the hydrogen supply source (not shown) into the liner 12 via the hydrogen gas supply pipe and the fixing member 62. When the hydrogen gas having been supplied in this way highly pressurizes the interior of the liner 12, the hydrogen gas easily permeates the liner 12, compared to the case in a low pressure state of the interior.

Even when the hydrogen gas having permeated the liner 12 further permeates the reinforced layer 14, since the outer surface of the reinforced layer 14 is covered by the barrier layer 16, it is possible to prevent the hydrogen gas from passing through the barrier layer 16. This barrier layer 16 is provided with the opening 16c through which the protrusion 40 of the cap 20 is exposed. The opening 16c is accommodated together with the protrusion 40 in the closed space 70 formed inside the isolation wall member 24. Hence, the hydrogen gas enters the gap between the outer surface of the reinforced layer 14 and the barrier layer 16, and moves toward the opening 16c of the barrier layer 16, and then is collected in the closed space 70 via the opening 16c.

As described above, the protrusion 40 is also accommodated in the closed space 70. Therefore, the hydrogen gas leaked out of the liner 12 via the supply/discharge hole 44 formed inside the protrusion 40 is also collected in the closed space 70. As described above, the hydrogen gas collected in the closed space 70 can be guided to the appropriate portion outside the vehicle via the communication unit 28.

In view of the above, this high pressure tank 10 can avoid a complicated configuration and a complicated manufacturing process, compared to a case where a resin film having barrier properties against the hydrogen gas is arranged on the inner surface of the liner 12. As a result, the simple configuration can effectively prevent the hydrogen gas from leaking to the outside of the high pressure tank 10 unintentionally.

As described above, the barrier layer 16 is arranged on the outer surface side of the reinforced layer 14. Consequently, it is possible to bring the inner surface of the reinforced layer 14 in direct contact with the outer surface of the liner 12. As a result, the reinforced layer 14 effectively reinforces the liner 12. It is possible to maintain the strength of the high pressure tank 10 suitably, while preventing the leakage of the hydrogen gas.

The isolation wall member 24 only needs to be arranged to form the closed space 70 that accommodates the protrusion 40 and the opening 16c of the barrier layer 16, and does not need to cover the entire liner 12 and reinforced layer 14. Consequently, it is possible to increase the degree of design freedom in fixing the high pressure tank 10 to the installation portion, compared to a case where the entire liner 12 and reinforced layer 14 are covered by the isolation wall member 24. That is, the fixing band 72 can be arranged along the outer circumferential surface of the glass fiber reinforced resin layer 18 exposed from the isolation wall member 24, i.e., at a body portion of the high pressure tank 10. Consequently, it is possible to easily and suitably fix the high pressure tank 10 to this installation site.

As described above, in this high pressure tank 10, the reinforced layer 14 is made of the carbon fiber reinforced resin, and the glass fiber reinforced resin layer 18 is arranged to cover part of the outer surface of the barrier layer 16. Consequently, it is possible to effectively improve the strength of the high pressure tank 10. The glass fiber reinforced resin layer 18 is arranged, so that it is possible to maintain the strength of the high pressure tank 10, while reducing the thickness of the reinforced layer 14.

The barrier layer 16 is disposed between the outer surface of the reinforced layer 14 and the glass fiber reinforced resin layer 18. Consequently, the shape of the glass fiber reinforced resin layer 18 can be designed without assuming that the glass fiber reinforced resin layer 18 is covered by the barrier layer 16. That is, it is possible to increase the degree of freedom in the shape of the glass fiber reinforced resin layer 18. Hence, as described above, the glass fiber reinforced resin layer 18 is arranged to cover the outer surface of the portion of the reinforced layer 14 except the curved dome-shaped portion 14b. Thus, it is possible to avoid a bending force from being applied to the glass fibers having higher rigidity than carbon fibers. As a result, it is possible to more easily obtain the high pressure tank 10 that has the high strength and can effectively prevent leakage of the fluid.

As described above, in this high pressure tank 10, the barrier layer 16 is formed by the film 16a wound around the outer surface of the reinforced layer 14. The barrier layer 16 can be easily formed to have a desired thickness, depending on the use of the high pressure tank 10.

As described above, the ridge/groove portion 16b formed in the film 16a defines the flow paths 68 between the film 16a and the outer surface of the reinforced layer 14. Consequently, even when fastening forces of the fixing bands 72 are applied to the barrier layer 16 via the glass fiber reinforced resin layer 18, the flow paths 68 can keep the shape between the film 16a and the outer surface of the reinforced layer 14. Even when the high pressure tank 10 is fixed by the fixing bands 72, the fluid having entered the gap between the outer surface of the reinforced layer 14 and the barrier layer 16 can be guided to and collected in the closed space 70 suitably via the flow paths 68 and the opening 16c of the barrier layer 16.

The present invention is not limited to the embodiment in particular, and can be variously modified without departing from the scope of the invention.

For example, in the high pressure tank 10 according to the embodiment, the glass fiber reinforced resin layer 18 is arranged to cover the outer surface of the portion of the reinforced layer 14 except the dome-shaped portion 14b, yet is not limited to this in particular. The glass fiber reinforced resin layer 18 may be arranged to cover the entire outer surface of the reinforced layer 14. Further, the barrier layer 16 may be disposed outside the glass fiber reinforced resin layer 18. In addition, the high pressure tank 10 may not include the glass fiber reinforced resin layer 18.

In the high pressure tank 10 according to the embodiment, the barrier layer 16 is formed by the film 16a wound around the outer surface of the reinforced layer 14 a plurality of times, yet is not limited to this in particular. For example, the barrier layer 16 may be formed by the film 16a of one layer or may be made of a material that is integrally molded to have a desired thickness and has gas permeability. The barrier layer 16 may be formed by a hard rubber material or a resin body.

The ridge/groove portion 16b is formed on the surface of the film 16a. However, the film 16a may have a flat shape without the ridge/groove portion 16b formed therein. In this case, spacers (not shown) may be interposed between, for example, at least the portion of the barrier layer 16 to which the pressing force is applied via the fixing band 72 and the outer surface of the reinforced layer 14, to form the flow paths 68. Further, the flow paths 68 may not be formed between the barrier layer 16 and the outer surface of the reinforced layer 14.

In the high pressure tank 10 according to the embodiment, the communication unit 28 connects the outside of the fuel cell vehicle and the closed space 70, yet is not limited to this in particular. For example, the communication unit 28 may be connected to a detecting unit that detects the hydrogen gas. The hydrogen gas collected in the closed space 70 may be diluted and then discharged to the outside of the vehicle.

What is claimed is:

1. A high pressure tank comprising:
a resin liner configured to be capable of containing a fluid;
a reinforced layer covering an outer surface of the liner; and
a cap including a supply/discharge hole configured to supply and discharge the fluid to and from the liner, wherein:
the cap includes a cylindrical protrusion having the supply/discharge hole formed therein; and
the high pressure tank further comprises:
a barrier layer covering an outer surface of the reinforced layer to block all or at least part of the fluid, the barrier layer including an opening configured to expose the protrusion, the barrier layer and the reinforced layer being formed by different materials from each other; and
an isolation wall member configured to accommodate the protrusion and the opening of the barrier layer in a closed space.

2. The high pressure tank according to claim 1, wherein:
the reinforced layer is made of a carbon fiber reinforced resin; and
the high pressure tank further comprises a glass fiber reinforced resin layer covering at least part of an outer surface of the barrier layer.

3. The high pressure tank according to claim 1, wherein the barrier layer is formed by a film wound around the outer surface of the reinforced layer and configured to block all or at least part of the fluid.

4. The high pressure tank according to claim 1, wherein the high pressure tank is fixed by a fixing band arranged along at least part of an outer circumferential surface of the high pressure tank.

5. The high pressure tank according to claim 4, wherein a flow path for the fluid is formed at least between the outer surface of the reinforced layer and a portion of the barrier layer to which a pressing force is applied via the fixing band.

6. The high pressure tank according to claim 1, wherein:
the high pressure tank is mounted on a vehicle; and
the high pressure tank comprises a communication unit configured to connect the closed space to an outside of the vehicle.

* * * * *